Aug. 10, 1948.  W. T. COOKE ET AL  2,446,529
SHOCK MOUNTED AND STABILIZED RANGE FINDER
Filed July 23, 1937  3 Sheets-Sheet 1
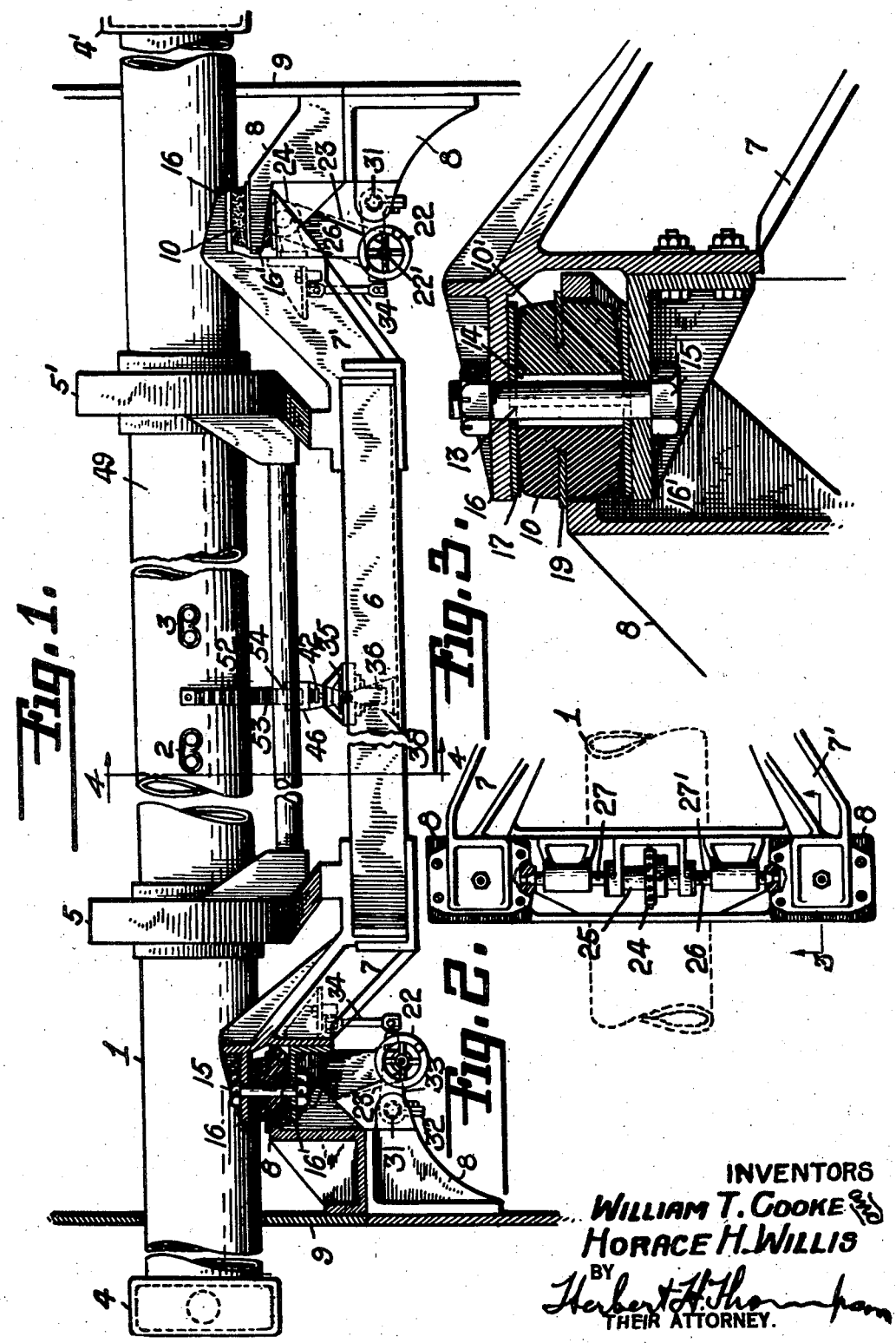
INVENTORS
WILLIAM T. COOKE
HORACE H. WILLIS
BY
Herbert H. Thompson
THEIR ATTORNEY.

Aug. 10, 1948.  W. T. COOKE ET AL  2,446,529
SHOCK MOUNTED AND STABILIZED RANGE FINDER
Filed July 23, 1937  3 Sheets-Sheet 2
Fig. 4.  Fig. 5.
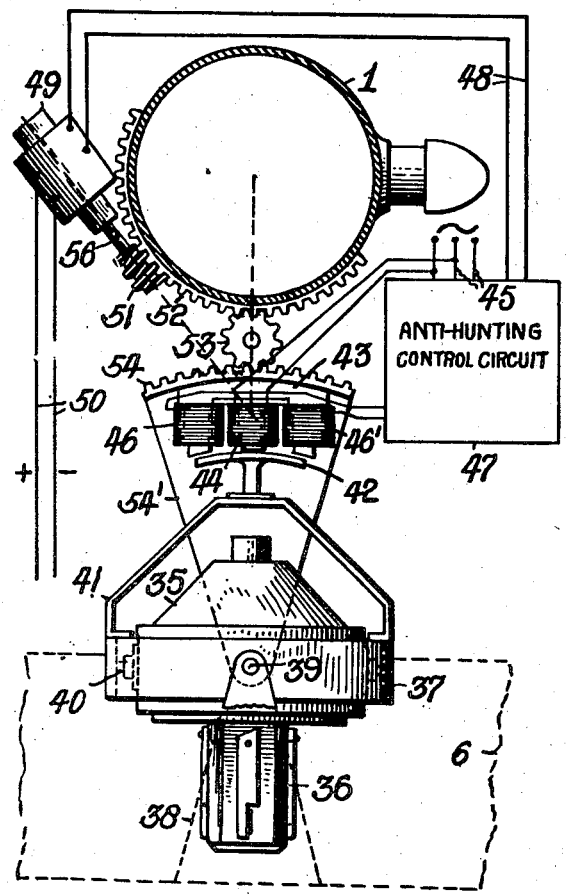
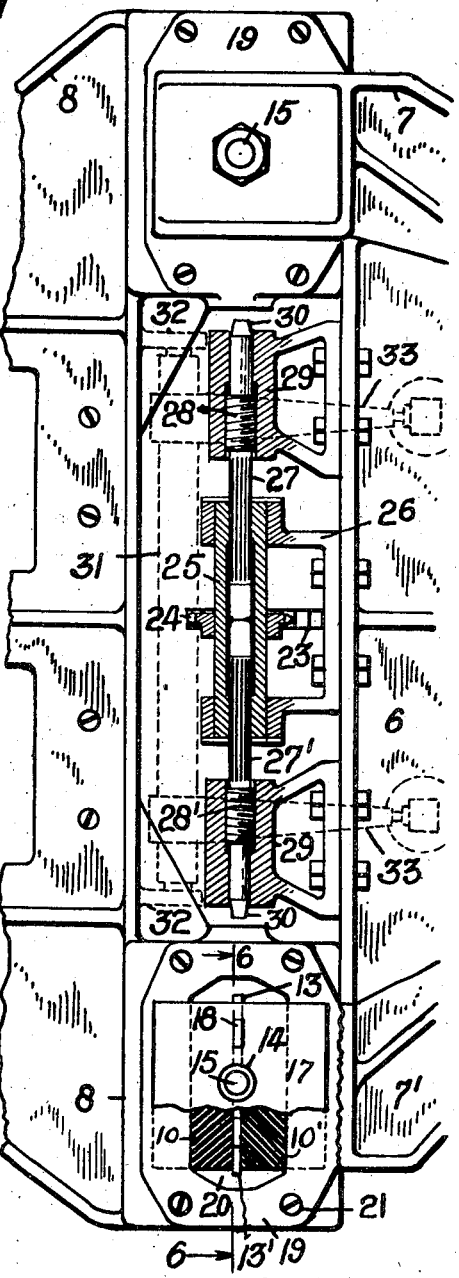
Fig. 6.
INVENTORS
WILLIAM T. COOKE
HORACE H. WILLIS
BY Herbert H. Thompson
THEIR ATTORNEY.

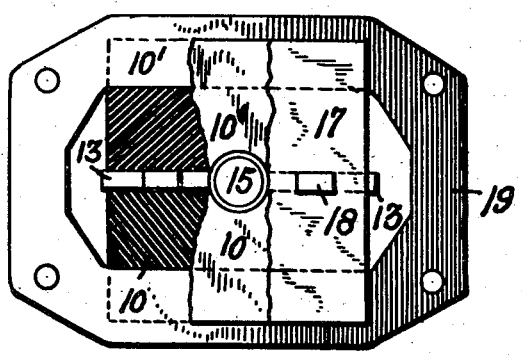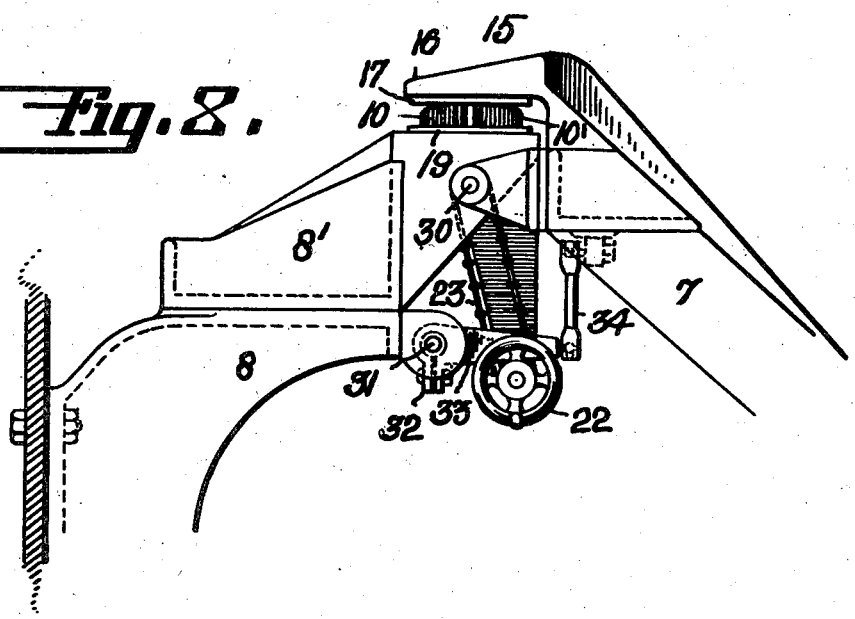

Patented Aug. 10, 1948

2,446,529

UNITED STATES PATENT OFFICE 2,446,529

SHOCK MOUNTED AND STABILIZED RANGE FINDER

William T. Cooke, Pelham Manor, and Horace H. Willis, Pelham, N. Y., assignors to The Sperry Corporation, a corporation of Delaware Application July 23, 1937, Serial No. 155,184

5 Claims. (Cl. 33—46)

This invention relates, generally, to optical sighting devices such as range finders, and the invention has reference, more particularly, to a novel shock mounted and stabilized range finder or like sighting device, for shipboard use.

Range finders and the like, as heretofore generally constructed, have not been shock mounted, with the result that inaccurate observations are often made and damage occurs to the range finder in use due to shock and vibration caused by gun detonation, engine and ship vibration, etc. In those installations where shock mountings have been used, such mountings have generally proved deficient due to inappropriate design. Also, while attempts have been made to stabilize range finders so as to maintain a fixed horizon, in practice such stabilization has proved faulty due to the application of the stabilizing force in directions setting up couples causing tilting of the range finder stand, resulting in the temporary shifting of the horizon of the range finder and consequent unsatisfactory operation.

The principal object of the present invention is to provide a novel construction of shock mounted and stabilized range finder that is free of the above mentioned defects, the structure of this invention providing for adequate absorption of shock and vibration in the shock mounts used and also providing true and continuous stabilization of the range finder through application of the stabilizing forces along a line extending substantially through the center of gravity of the combined range finder tube and stand therefor, whereby such stabilizing forces do not tend to tilt the stand and cause temporary shifting of the horizon.

Other objects and advantages will become apparent from the specification, taken in connection with the accompanying drawings wherein one embodiment of the invention is illustrated.

In the drawings,

Fig. 1 is a view in elevation, with parts broken away, showing the novel shock mounted and stabilized range finder of this invention, certain well known parts of the range finder being omitted to simplify the drawing.

Fig. 2 is a detail fragmentary view looking up at a portion of the structure of Fig. 1 from below and showing the stand in locked position.

Fig. 3 is an enlarged sectional view taken along line 3 of Fig. 2, looking in the direction of the arrow.

Fig. 4 is an enlarged schematic sectional view taken along line 4—4 of Fig. 1 and also illustrates the circuits involved.

Fig. 5 is an enlarged view of the structure of Fig. 2, with parts broken away, and shows the stand in unlocked position, as in use.

Fig. 6 is an enlarged sectional view taken along line 6—6 of Fig. 5, looking in the direction of the arrows.

Fig. 7 is a detailed plan view, partly in section, of one of the rubber shock mountings.

Fig. 8 is a front elevation of a part of Fig. 1, bringing out in more detail the raising and lowering mechanism for locking the stand when not in use.

Similar characters of reference are used in all of the above figures to indicate corresponding parts.

Referring now to the several figures of the drawings, the reference numeral 1 designates the range finder tube, having eye pieces 2 and 3 for making observations in azimuth and elevation and light receiving apertures 4 and 4' at the ends thereof for receiving reflected light from the objects observed. The tube is mounted for turning about its longitudinal axis in bearings provided in standards 5 and 5' mounted on the range finder stand 6. This stand 6 is shown as consisting of a central beam section terminating in upwardly inclined end sections, each of which end sections is shown as including diverging, spaced beams 7 and 7'. The known equipment for turning the tube 1 in azimuth and elevation has been left out of the drawings for the purpose of simplifying the same.

The free ends of the stand end section beams 7, 7' are each shock mounted upon wall brackets 8 that are attached to the walls 9, as of the gun turret. The shock mounts for the stand 6 are four in number, as especially shown in Figs. 1 to 3 and 5 of the drawings, and each of these mounts comprises two blocks of rubber 10 and 10' that are of substantially rectangular shape in plan, as shown in Fig. 5, and are vulcanized to opposite sides of vertical metal plates 13 and 13', thereby forming a unitary structure or member that is provided with a central vertical aperture 14 for receiving a vertical bolt 15 that extends through the rubber shock mount member 10, 10' and through the upper and lower brackets 16, 16' provided on each of the beams 7 or 7', as the case may be. Washer plates 17 are interposed between mount member 10, 10' and brackets 16, 16', these washer plates being provided with apertures for receiving lugs 18, 18' (see Fig. 6) provided on the plates 13, 13', which lugs serve to retain the washer plates 17 in assembled relation with vertical metal plates 13 and 13'.

Each rubber shock mount member 10, 10' is initially so shaped as to have its central upper portion somewhat higher than its marginal portions so that when this element is placed under load due to the weight of the stand and supported parts, as shown in the figures, it will assume the shape therein illustrated, with upper and lower surfaces that are slightly convexly curved (see especially Fig. 3) whereby the load is carried by the vertical plates 13, 13' and is transmitted by these plates in shear to the rubber blocks 10 and 10'.

Each shock member or element 10, 10' is supported upon its wall bracket 8 by means of a substantially rectangular frame plate 19 that is horizontally disposed and has a central, substantially rectangular aperture 20 for accommodating the elements 10, 10' and has its side portions embedded and preferably molded in the rubber blocks of element 10, 10', as shown especially in Figs. 3 and 5. Each frame plate 19 is secured to the bracket 8 as by bolts or screws 21.

As thus constructed, the weight of the stand 6 and parts supported thereby, including tube 1, is transmitted through the shock element 10, 10' as a shearing stress, the adhesion between plates 13, 13' and the rubber serving to cause the vertical plates 13, 13' to exert a shearing stress upon the rubber body which is transmitted therethrough to the frame plate 19 resting upon the bracket 8. Owing to the use of a shearing stress resulting in shearing strains in the rubber, the low natural frequency of the system resulting from the use of the rubber body 10, 10' is maintained throughout large variations in load due to shock or vibration, which would not be true were the range finder stand supported by direct compressional forces existing in the rubber element 10, 10'. In other words, should solid blocks of rubber be used in lieu of the element 10, 10' with the stand mounted upon the upper surfaces of the rubber blocks and the bracket 8 supporting the lower surfaces thereof, the rate of yield of the rubber would rapidly decrease with increase in load, resulting in appreciable shocks being transmitted through the rubber to the stand and tube, thereby greatly lessening the utility of the shock mounting. On the other hand, by causing the stand and tube to be supported by the use of shearing stresses as in the present structure, resulting in shearing strains in the rubber blocks, the rubber maintains a substantially constant ratio of incremental stress to strain or distortion over a large range of loads, with the result that the low natural frequency of the system is not interfered with and hence shocks of all magnitudes are thoroughly absorbed by the rubber shock mounts to thereby eliminate objectionable jarring or vibration of the range finder stand and tube.

At times it is desirable to lock the stand to the brackets 8, thereby preventing the shock mounts from functioning, as during periods of non-use of the range finder. To accomplish this, handwheels 22 are provided at the ends of stand 6 adjacent the brackets 8, the said handwheels being fixed to shafts 22' rotatably carried by bearing brackets 26 fixed on the end portions of stand 6. Shafts 22' have sprockets fixed therein for driving sprocket chains 23 that pass over sprockets 24 that are fixed on tubular shafts 25 rotatably mounted in the bearing brackets 26 attached to the ends of stand 6. Each tubular shaft 25 is internally splined to lock shafts 27, 27' that are provided with right and left hand threads 28 and 28', respectively, engaging in internally threaded blocks 29 secured to the stand 6. The outer free end portions of the lock shafts 27, 27' are conically bevelled at 30 for engaging in conforming recesses provided in the wall brackets 8. Hence, by turning the handwheels 22, thereby turning sprocket 24 and tube shaft 25, the lock shafts 27 and 27' are made to move either toward each other into the unlocked position shown in Fig. 5, or away from each other into the locked position shown in Fig. 2. During the use of the range finder, the lock shafts 27 and 27' are moved into their retractive positions as shown in Fig. 5, thereby permitting the shock mounts to function to absorb shocks and vibrations to thereby protect the range finder tube 1 therefrom.

To insure the equalization of loads on both shock mounts at each end of the tube stand, an equalizer mechanism is employed, consisting of a shaft 31 extending transversely of tube 1 below the same and having its end portions journaled in bearings provided in lugs 32 carried by brackets 8. Shaft 31 has arms 33 fixed thereto adjacent the ends thereof, the outer ends of which arms are connected by links 34 to the stand 6 adjacent the opposite sides thereof. Thus, any tendency for one side of the stand 6 to move vertically will turn shaft 31 and arms 33 to cause the other side thereof to move similarly, thereby tending to substantially equalize the loads and movements of both sides of the tube stand and thus aiding in preventing transverse tilting thereof.

The means for stabilizing the range finder 1 so that the same will provide a substantially fixed horizon, comprises a vertical gyro 35, shown as having means 36 for automatically erecting the same, such means being disclosed in Patent #1,982,636 to Carlson, dated December 4, 1934. The gyroscope 35 is supported in a suitable gimbal mounting, as shown, including a gimbal ring 37 pivotally mounted on brackets 38 carried by the tube stand 6, by means of pivots 39 on the major axis of the gyroscope, the gyro casing being mounted by pivots 40 upon gimbal ring 37 on the minor axis of the gyroscope extending at right angles to axis 39. A bridge member 41 is fixed upon the gimbal ring 37 and extends upwardly therefrom to carry a cylindrical segment or armature 42 of magnetic material, such as soft iron, that cooperates with the three poles of a transformer member 43 similar to that shown and described in copending application of Cooke et al., now Patent No. 2,139,558, dated December 6, 1938, and Moseley Patent No. 2,088,659, dated August 3, 1937. The central coil 44 of member 43 is supplied with single phase alternating current from a suitable source, such as a three phase source 45. The outer coils 46 and 46' are connected together in series and to the input of an amplifier anti-hunting control circuit 47. The control circuit 47 may be similar to that shown and described in either of the above mentioned applications and hence would appear to require no further description at this time.

The output leads 48 of the control circuit 47 are connected for controlling a servo motor 49 employed for stabilizing the range finder tube 1 in elevation so that the same shall have a stabilized horizon. This motor 49 is suitably mounted upon the stand 6. The field winding of motor 49 is shown as supplied from a suitable D. C. source through leads 50. The shaft 56 of motor 49 carries a worm 51 meshing with a worm wheel sector 52 carried by the tube 1. A follow-up connection between the tube 1 and the gyroscope is provided by means of a pinion 53 meshing with the gear sector 52 and with a gear sector 54 secured to the transformer member 43. This transformer member is suitably supported as by the segmental plate 54' for turning about the major axis 39 of the gyroscope.

As thusly arranged, any relative movement between the gyroscope carried segment 42 and transformer or pick-off member 43 will cause the control circuit 47 to operate motor 49 to turn range finder tube 1 so as to maintain this tube stabilized in elevation, the follow-back connection 53, 54 serving to return the transformer member 43 to central position with respect to segment 42. Owing to the use of the anti-hunting control circuit 47, the tube 1 is moved synchronously with relative movements occurring between the segment 42 and member 43 and without hunting, whereby this tube maintains a fixed azimuth at all times.

The motor 49 is so disposed that the longitudinal axis of its shaft 56, and hence the direction of the thrust exerted by worm 51 upon gear 52, passes substantially through the center of gravity of the shock mounted movable system, i. e., the stand 6 and parts carried thereby, including tube 1, whereby the reaction of this thrust acting through motor 49 upon the stand does not tend to tilt the stand 6 in use, which otherwise must occur in all cases where this line of thrust does not pass through the center of gravity of the movable system.

In those instances heretofore mentioned, where stabilization of range finder tubes has been attempted, the line of thrust of the stabilizing force was displaced from the center of gravity of the combined tube and stand, with the result that a couple is produced tending to tilt the stand, resulting invariably in a temporary shifting of the tube horizon, which not only delays the taking of sights but introduces errors which are avoided by the apparatus of the present invention, because of the fact that the reaction force exerted upon the stand by motor 49 by acting through the center of gravity of the shock mounted movable system places equal loads on all of the shock mounts 10, 10' so that these mounts are deflected equally, thereby eliminating tilting of the stand 6 and corresponding shifting of the tube horizon.

In some instances where it is not convenient to place the motor 49 at the center of the length of tube 1 so that its thrust passes directly through the center of gravity of the movable system, this motor need not necessarily be placed exactly central, in which case the line of thrust of the motor 49 and gear 51 should pass through a line extending parallel to the longitudinal axis of stand 6 and passing through the center of gravity of the shock mounted movable system. Inasmuch as this arrangement may cause some endwise tilting of the tube 1, it is preferable, wherever possible, to locate the motor 49 so that the thrust reaction thereof passes substantially through the center of gravity of the shock mounted system.

It will be noted that any tendency of the range finder supporting brackets to oscillate or vibrate the range finder tube about a vertical axis will also be absorbed by the shock mounts due to the fact that transverse vibration is attenuated and isolated by these shock mounts acting in shear just as in the case of vertical vibrations or shocks.

Thus, it will be noted that the novel shock mounts of this invention serve to isolate the range finder tube from ship vibrations in all possible directions.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an optical instrument, a cushioned support, a sighting device mounted on said support for angular movement in elevation thereon, a gyro vertical mounted on said support, an armature carried by said gyroscope, a transformer member magnetically coupled to said armature, a control circuit fed from said transformer member and responsive to relative movements in elevation of said gyro vertical and device, and a motor connected to be controlled from said circuit and operating to stabilize said sighting device without twisting said support.

2. An optical instrument as defined in claim 1, wherein a follow-back connection is provided between said sighting device and said transformer member.

3. In a range finder, a shock mounted structure comprising a range finder tube, a stand therefor, and means for stabilizing said tube, including a vertical gyroscope universally mounted on said stand and having an armature carried by its gimbal ring, an electrical pick-off coupled to said armature and being turnable about the pivotal axis of said gimbal ring, an anti-hunting control circuit fed from said pick-off, and a motor controlled from said circuit and connected for turning said range finder tube, the reaction thrust of said motor passing substantially through the center of gravity of said shock mounted structure, whereby operation of said means does not cause tilting of said stand and tube.

4. In an optical instrument, a support, a plurality of spaced cushioning means for said support, a sighting device mounted on said support for angular movement in elevation thereon, a gyro vertical mounted on said support with freedom about an axis parallel to the axis of movement of said device, a two-part electrical inductive pick-off the parts of which are relatively displaced by relative movement of said device and gyro vertical about said axes, an amplifier circuit fed from said pick-off, and a motor also mounted on said support and geared to said device in such manner that the reaction therefrom on said support has no lever arm tending to rotate the support, said motor being controlled from said circuit and operating to stabilize said sighting device.

5. An optical instrument as defined in claim 4, wherein a follow-back connection is provided between said sighting device and one of said inductive pick-off parts.

WILLIAM T. COOKE.
HORACE H. WILLIS.

REFERENCES CITED

The following references are of record in the file of this patent:

UNITED STATES PATENTS

| Number | Name | Date |
|---|---|---|
| 1,425,742 | Barr et al. | Aug. 15, 1922 |
| 1,877,021 | Northrop et al. | Sept. 13, 1932 |
| 1,887,318 | Mahoney | Nov. 8, 1932 |
| 1,959,804 | Wittkuhns et al. | May 22, 1934 |
| 1,970,442 | Wittkuhns | Aug. 14, 1934 |
| 1,982,221 | McClay | Nov. 27, 1934 |
| 1,999,897 | Fieux | Apr. 30, 1935 |
| 2,059,313 | Carter | Nov. 3, 1936 |
| 2,075,844 | Goldsmith | Apr. 6, 1937 |
| 2,077,398 | Clark | Apr. 20, 1937 |
| 2,090,564 | Zimmermann | Aug. 17, 1937 |

FOREIGN PATENTS

| Number | Country | Date |
|---|---|---|
| 20,373 | Great Britain | 1910 |
| 322,497 | Great Britain | 1929 |